United States Patent
Tsujioka et al.

(10) Patent No.: US 12,537,272 B2
(45) Date of Patent: Jan. 27, 2026

(54) SECONDARY BATTERY

(71) Applicant: PRIME PLANET ENERGY & SOLUTIONS, INC., Tokyo (JP)

(72) Inventors: Katsuji Tsujioka, Nishinomiya (JP); Hiroshi Takabayashi, Koriyama (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 643 days.

(21) Appl. No.: 17/938,425

(22) Filed: Oct. 6, 2022

(65) Prior Publication Data
US 2023/0121750 A1 Apr. 20, 2023

(30) Foreign Application Priority Data

Oct. 14, 2021 (JP) .................. 2021-168637

(51) Int. Cl.
*H01M 50/636* (2021.01)
*H01M 50/184* (2021.01)

(52) U.S. Cl.
CPC ....... *H01M 50/636* (2021.01); *H01M 50/184* (2021.01)

(58) Field of Classification Search
CPC ............. H01M 50/636; H01M 50/184; H01M 50/147; H01M 50/186; H01M 50/645; H01M 50/10; H01M 50/15; Y02E 60/10
See application file for complete search history.

(56) References Cited

U.S. PATENT DOCUMENTS

| 2010/0003583 A1* | 1/2010 | Seong ............ H01M 50/186 29/623.2 |
| 2010/0304214 A1* | 12/2010 | Itoh ............... H01M 50/186 429/185 |
| 2011/0072648 A1 | 3/2011 | Yamauchi |

(Continued)

FOREIGN PATENT DOCUMENTS

| JP | H 04-63559 U | 5/1992 |
| JP | H087878 A * | 1/1996 |
| JP | 2001-023586 A | 1/2001 |

(Continued)

OTHER PUBLICATIONS

Notice of Reasons for Refusal issued in Japanese Application No. JP 2021-168637, dated Jan. 5, 2024.

*Primary Examiner* — Matthew T Martin
*Assistant Examiner* — Bartholomew A Hornsby
(74) *Attorney, Agent, or Firm* — Finnegan, Henderson, Farabow, Garrett, and Dunner, LLP

(57) ABSTRACT

Provided is a technology to suppress a decrease in airtightness around a liquid injection port of a secondary battery. A secondary battery disclosed here has a lid having a liquid injection port, a resin washer attached to the liquid injection port, and a sealing member. The sealing member has a sleeve inserted into the liquid injection port and a flange extending from the sleeve along an outer surface of the lid in an outer diameter direction. The resin washer is installed in the liquid injection port and is sandwiched between the flange and the outer surface of the lid. A protrusion protruding toward the outer surface of the lid is provided at a radial intermediate portion of the flange. A restricting portion that restricts an outer edge of the resin washer is provided in the lid or the sealing member.

4 Claims, 3 Drawing Sheets

(56) References Cited

U.S. PATENT DOCUMENTS

2013/0216876 A1\* 8/2013 Kim .................... H01M 50/184
429/84
2021/0159563 A1 5/2021 Tanaka et al.

FOREIGN PATENT DOCUMENTS

| JP | 2009-048968 A | | 3/2009 |
|---|---|---|---|
| JP | 2010-277936 A | | 12/2010 |
| JP | 2013-161711 A | | 8/2013 |
| JP | 2014-175143 A | | 9/2014 |
| JP | 2015-099688 A | | 5/2015 |
| JP | 2015210950 A | \* | 11/2015 |
| JP | 2018-185969 A | | 11/2018 |

\* cited by examiner

SECONDARY BATTERY

CROSS REFERENCE TO RELATED APPLICATIONS

This application claims priority under Japanese Patent Application No. 2021-168637 filed on Oct. 14, 2021, and the entire contents of that application are incorporated herein by reference.

BACKGROUND OF THE DISCLOSURE

1. Technical Field

The present disclosure relates to a secondary battery.

2. Background

In Japanese Patent Application Publication No. 2018-185969, Japanese Patent Application Publication No. 2010-277936, and Japanese Patent Application Publication No. 2014-175143, a secondary battery is disclosed, in which an electrode body, which is a power generation element, is accommodated inside a battery case. In the secondary battery disclosed in the above publications, the lid of the battery case is provided with a through-hole (liquid injection hole) for injecting an electrolytic solution into the battery case. The liquid injection hole is sealed with a sealing member, and a seal member is arranged between the outer surface of the lid and the sealing member.

SUMMARY OF THE INVENTION

Incidentally, the present inventors desire to suppress the decrease in airtightness around the liquid injection port provided on the lid of the secondary battery.

According to the technology disclosed herein, there is provided a secondary battery having an electrode body, a case main body having an opening for accommodating the electrode body, and a lid attached to the opening of the case main body. The lid has a liquid injection port, a flat annular resin washer attached to the liquid injection port, and a sealing member. The sealing member has a sleeve inserted into the liquid injection port and a flange extending from the sleeve along an outer surface of the lid in an outer diameter direction. The resin washer is installed in the liquid injection port and is sandwiched between the flange and the outer surface of the lid. A protrusion protruding toward the outer surface of the lid is provided at a radial intermediate portion of the flange. A restricting portion that restricts an outer edge of the resin washer is provided in the lid or the sealing member.

In a secondary battery having such a configuration, by arranging a resin washer between the flange of the sealing member and the outer surface of the lid, the resin washer is compressed between the flange and the outer surface, and the airtightness of the liquid injection port can be ensured. Further, by providing a protrusion at the radial intermediate portion of the flange, when the resin washer is compressed between the flange and the outer surface, the protrusion bites into the resin washer and can locally exert a larger compressive force on the resin washer. On the other hand, when the compressive force applied to the resin washer escapes in the outer diameter direction of the resin washer, the resin washer spreads in the same direction, and the airtightness of the liquid injection port may decrease. In the secondary battery disclosed here, the restricting portion provided on the lid or the sealing member can suppress the spread of the resin washer in the outer diameter direction of the resin washer, and suppress the decrease in airtightness of the liquid injection port.

In a preferred aspect of the secondary battery disclosed herein, the flange has a wall portion extending along an outer peripheral edge of a resin washer toward the outer surface of the lid. A restricting portion is provided on an inner surface of the wall portion. According to such a configuration, the restricting portion provided on the inner surface of the wall portion can suppress the spread of the resin washer in the outer diameter direction and suppress the decrease in airtightness of the liquid injection port.

Further, in another preferred aspect of the secondary battery disclosed herein, a step recessed around the liquid injection port is provided on the outer surface of the lid. The restricting portion is provided on an inner wall surface of the step. According to such a configuration, the restricting portion formed on the inner wall surface of the recessed step provided on the outer surface of the lid can suppress the spread of the resin washer in the outer diameter direction and suppress the decrease in airtightness of the liquid injection port.

More preferably, the step is formed with a tapered surface that projects toward an inner diameter side of the liquid injection port as the step becomes deeper. According to such a configuration, the effect of suppressing the decrease in airtightness of the liquid injection port can be better realized.

DETAILED DESCRIPTION OF THE PREFERRED EMBODIMENTS

Figure 1:
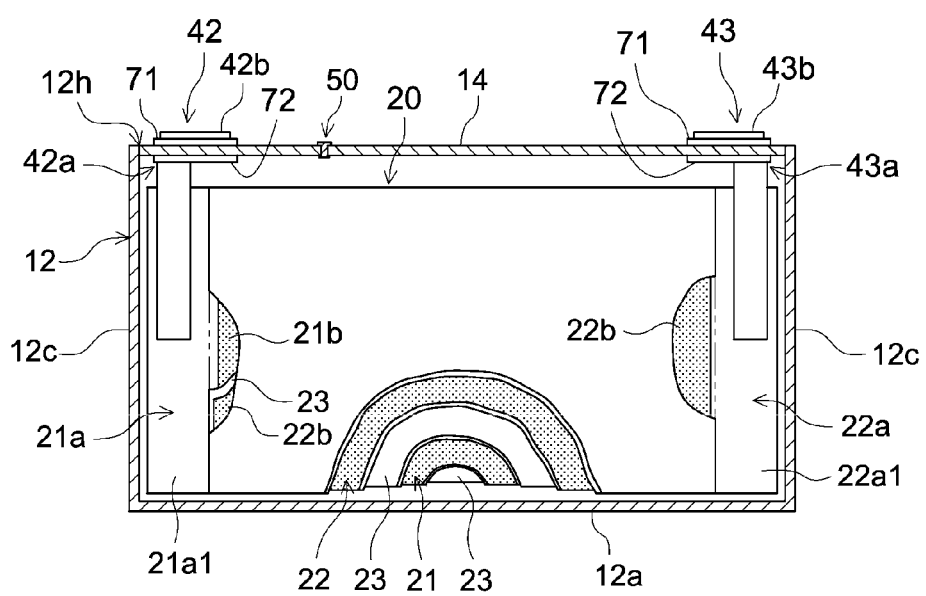
FIG. 1 is a partial cross-sectional view of a secondary battery 100.

Hereinafter, an embodiment of the secondary battery disclosed here will be described. It is needless to say that the embodiments described herein are not intended to specifically limit the invention. The technology disclosed herein is not limited to the embodiments described herein, unless otherwise stated. Each drawing is drawn schematically and does not necessarily reflect the actual objects. Further, members and parts having the same action will be appropriately given the same reference numerals, and duplicate description thereof will be omitted. Further, notation such as "A to B" indicating a numerical range means "A or more and B or less" and also includes the meaning of "more than A and less than B," unless otherwise stated.

In the present specification, the term "secondary battery" refers to a general storage device in which a charge/discharge reaction occurs when charge carriers move between a pair of electrodes (positive electrode and negative electrode) via an electrolyte. Such a secondary battery includes not only a so-called storage battery such as a lithium-ion secondary battery, a nickel-hydrogen battery, and a nickel-cadmium battery, but also a capacitor such as an electric double layer capacitor. Hereinafter, an embodiment based on a lithium-ion secondary battery among the above-mentioned secondary batteries will be described.

First Embodiment

Secondary Battery 100

FIG. 1 is a partial cross-sectional view of a secondary battery 100. FIG. 1 shows a state where the inside is exposed along a wide surface on one side of a substantially rectangular parallelepiped case main body 12. As shown in FIG. 1, the secondary battery 100 includes the case main body 12, a lid 14, and an electrode body 20.

Electrode Body 20

The electrode body 20 is a power generation element of the secondary battery 100, and includes a positive electrode, a negative electrode, and a separator that separates the positive electrode and the negative electrode. The electrode body 20 is covered with an insulating film (not shown) or the like and accommodated in the case main body 12. In this embodiment, the electrode body 20 includes a positive electrode sheet 21 as a positive electrode element, an negative electrode sheet 22 as a negative electrode element, and a separator sheet 23 as a separator. The positive electrode sheet 21, the negative electrode sheet 22, and the separator sheet 23 are each long strip-shaped member.

Positive Electrode Sheet 21

On the positive electrode sheet 21, on a positive electrode current collector foil 21a (for example, an aluminum foil) having a predetermined width and thickness, except for an unformed portion 21a1 set with a constant width at an end portion on one side in the width direction, a positive electrode active material layer 21b containing a positive electrode active material is formed on both surfaces. The positive electrode active material is, for example, a material that can release lithium ions during charging and absorb lithium ions during discharging, such as a lithium transition metal composite material in a lithium-ion secondary battery. Various positive electrode active materials have been generally proposed in addition to the lithium transition metal composite material, and are not particularly limited.

Negative Electrode Sheet 22

On the negative electrode sheet 22, on a negative electrode current collector foil 22a (for example, a copper foil) having a predetermined width and thickness, except for an unformed portion 22a1 set with a constant width at the edge on one side in the width direction, a negative electrode active material layer 22b containing a negative electrode active material is formed on both surfaces. The negative electrode active material is, for example, in a lithium-ion secondary battery, similar to natural graphite, a material that can occlude lithium ions during charging, and during discharging, release the lithium ions occluded during charging. Various negative electrode active materials have been generally proposed in addition to natural graphite, and are not particularly limited.

Separator Sheet 23

For the separator sheet 23, for example, a porous resin sheet through which an electrolyte having a required heat resistance can pass is used. Various separator sheets 23 have also been proposed and are not particularly limited.

Here, the width of the negative electrode active material layer 22b is formed wider than, for example, the positive electrode active material layer 21b. The width of the separator sheet 23 is wider than that of the negative electrode active material layer 22b. The unformed portion 21a1 of the positive electrode current collector foil 21a and the unformed portion 22a1 of the negative electrode current collector foil 22a are directed to opposite sides in the width direction. Further, the positive electrode sheet 21, the separator sheet 23, the negative electrode sheet 22, and the other separator sheets 23 are each aligned in the length direction, and are stacked and wound in order. The negative electrode active material layer 22b covers the positive electrode active material layer 21b with the separator sheet 23 interposed therebetween. The negative electrode active material layer 22b is covered with a separator sheet 23. The unformed portion 21a1 of the positive electrode current collector foil 21a protrudes from one side of the separator sheet 23 in the width direction. The unformed portion 22a1 of the negative electrode current collector foil 22a protrudes from the separator sheet 23 on the opposite side in the width direction.

As shown in FIG. 1, the electrode body 20 is in a flat state along a plane including a winding shaft to be accommodated in the case main body 12. Along the winding shaft of the electrode body 20, the unformed portion 21a1 of the positive electrode current collector foil 21a is arranged on one side, and the unformed portion 22a1 of the negative electrode current collector foil 22a is arranged on the opposite side. In addition, here, the winding type electrode body 20 is exemplified. The structure of the electrode body 20 is not limited to such a form. The structure of the electrode body 20 may be, for example, a laminated structure in which a positive electrode sheet and a negative electrode sheet are alternately laminated with a separator sheet interposed therebetween. Further, the plurality of electrode bodies 20 may be accommodated in the case main body 12.

Case Main Body 12

As shown in FIG. 1, the case main body 12 accommodates the electrode body 20 and has an opening 12h tier accommodating the electrode body 20. The case main body 12 has a substantially rectangular parallelepiped square shape with one side surface open. As shown in FIG. 1, the case main body 12 has a substantially rectangular bottom surface 12a, a pair of wide surfaces (not shown), and a pair or narrow surfaces 12c. Each of the pair of wide surfaces rises from the long sides of the bottom surface 12a. Each of the pair of narrow surfaces 12c rises from the short sides of the bottom surface 12a. The opening 12h is formed by being surrounded by a pair of long sides of a wide surface and a pair of short sides of a narrow surface 12c. In this embodiment, the case main body 12 and the lid 14 that will be described later are each made of aluminum or an aluminum alloy mainly composed of aluminum from the viewpoint of ensuring weight reduction and required rigidity.

Further, the case main body 12 may accommodate an electrolytic solution (not shown) together with the electrode body 20. As the electrolytic solution, a non-aqueous electrolytic solution in which a supporting salt is dissolved in a non-aqueous solvent can be used. Examples of non-aqueous solvents include carbonate solvents such as ethylene carbonate, dimethyl carbonate, and ethyl methyl carbonate. Examples of supporting salts include a fluorine-containing lithium salt such as $LiPF_6$.

Lid 14

The lid 14 is attached to the opening 12h of the case main body 12. Then, the peripheral edge portion of the lid 14 is bonded to the edge of the opening 12h of the case main body 12. Such bonding may be, for example, continuous welding with no gaps. Such welding can be achieved, for example, by laser welding. The case main body 12 and the lid 14 have sizes corresponding to the number of the electrode bodies 20 to be accommodated, the size, and the like. A positive electrode terminal 42 and a negative electrode terminal 43 are attached to the lid 14. The positive electrode terminal 42 includes an internal terminal 42a and an external terminal 42b. The negative electrode terminal 43 includes an internal terminal 43a and an external terminal 43b. The internal terminals 42a and 43a are each attached to the inside of the lid 14 via an insulator 72. The external terminals 42b and 43b are each attached to the outside of the lid 14 via a gasket 71. The internal terminals 42a and 43a each extend inside the case main body 12. The tip of the internal terminal 42a of the positive electrode is connected to the unformed portion 21a1 of the positive electrode current collector foil 21a. The tip of the internal terminal 43a of the negative electrode is connected to the unformed portion 22a1 of the negative electrode current collector foil 22a.

Although detailed illustration is omitted, in this embodiment, the lid 14 is provided with a gas discharge valve. The gas discharge valve is a thin-walled portion configured to break when the internal pressure of the secondary battery 100 exceeds a predetermined value and discharge the gas in the secondary battery 100 to the outside.

Figure 2:
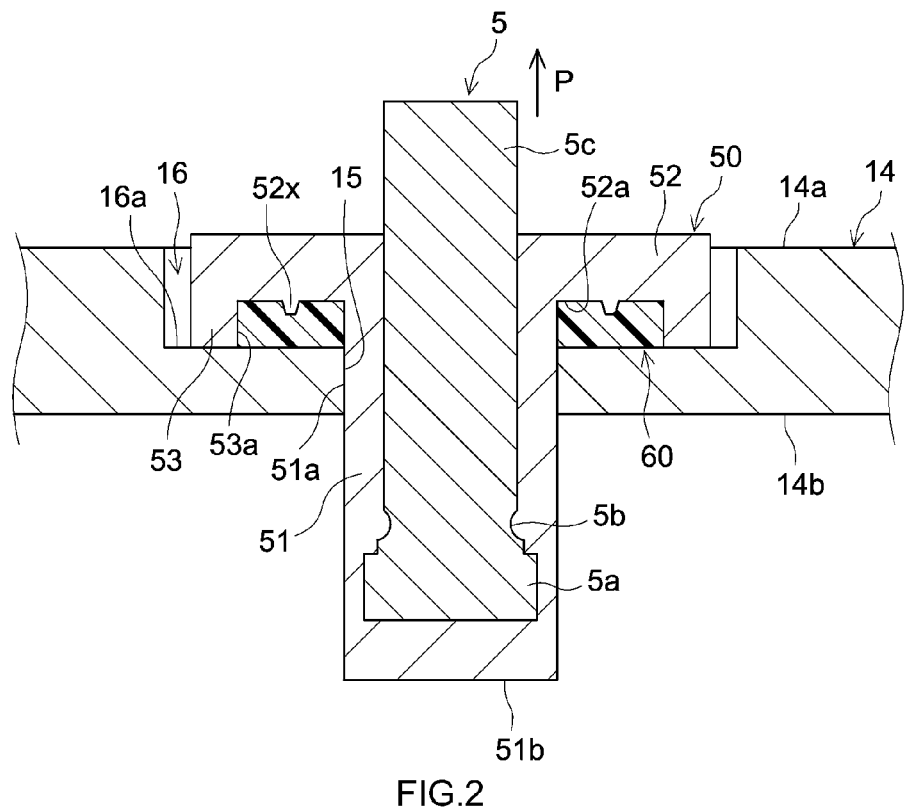
FIG. 2 is a partial cross-sectional view for describing attachment of a sealing member 50 to a liquid injection port 15.
Figure 3:
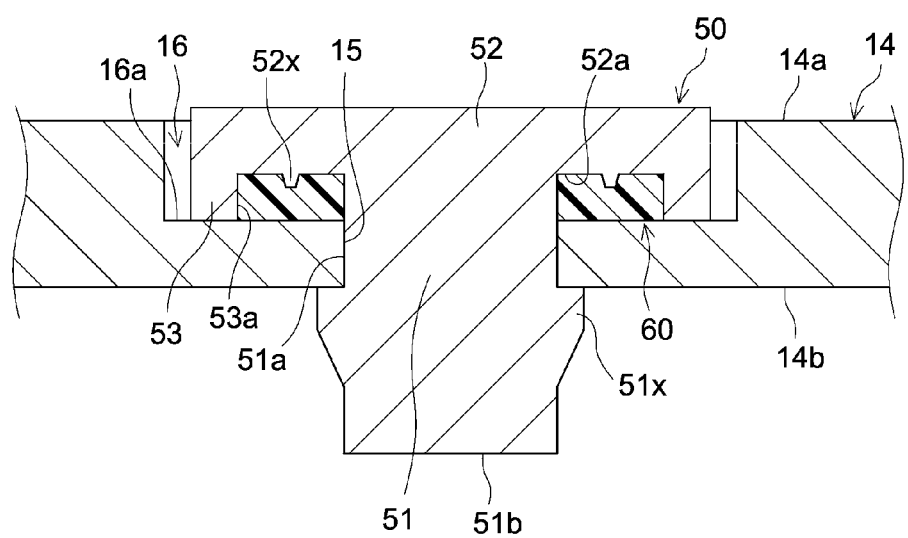
FIG. 3 is a partial cross-sectional view showing a state where the liquid injection port 15 is sealed with the sealing member 50.

Further, in this embodiment, the lid 14 has a liquid injection port 15 (refer to FIGS. 2 and 3). The liquid injection port 15 is a through-hole for injecting an electrolytic solution after bonding the lid 14 to the case main body 12. In this embodiment, the planar shape of the liquid injection port 15 when viewed from the electrode terminal side is a circular shape. The liquid injection port 15 is sealed with the sealing member 50.

Incidentally, in the conventional secondary battery, a resin washer may be attached to a liquid injection port provided on the lid. When the sealing member is installed in the liquid injection port in a state where the resin washer is attached, the resin washer is compressed between the sealing member and the outer surface of the lid. By compressing the resin washer, the resin washer can be brought into close contact with the sealing member and the liquid injection port, and thus the liquid injection port can be airtightly sealed. The present inventors desire to further improve the airtightness of the liquid injection port.

Hereinafter, the structure in the vicinity of the liquid injection port 15 of the secondary battery 100 disclosed here will be described. FIG. 2 is a partial cross-sectional view for describing attachment of the sealing member 50 to the liquid injection port 15. FIG. 3 is a partial cross-sectional view showing a state where the liquid injection port 15 is sealed with the sealing member 50. FIG. 2 shows a state before the sealing member 50 is deformed in a state where the sealing member 50 is installed in the liquid injection port 15. FIG. 3 shows a state where the liquid injection port 15 is sealed after the sealing member 50 is deformed. As shown in FIGS. 2 and 3, a resin washer 60 is attached and then the sealing member 50 is attached to the liquid injection port 15. In this embodiment, a recessed step 16 around the liquid injection port 15 is provided on an outer surface 14a of the lid 14. The recessed step 16 is formed around the liquid injection port 15 according to the region where the sealing member 50 is attached. When the sealing member 50 is attached around the liquid injection port 15, a part of the sealing member 50 is configured to be fit in the recessed step 16. Such a recessed part is also referred to as a counterbore 16.

Sealing Member 50

The sealing member 50 has a sleeve 51 and a flange 52, as shown in FIGS. 2 and 3.

The sleeve 51 is a bottomed hollow shaft-shaped part of the sealing member 50, which is inserted into the liquid injection port 15. For example, a mandrel 5 which is a shaft member is installed in such a hollow portion. In this embodiment, a bottom portion 51b of the sleeve 51 is formed in the shape of a closed bag. The tip of the mandrel 5 is covered with the bottom portion 51b of the sleeve 51. The mandrel 5, for example, in the form shown in FIG. 2, has a head portion 5a, a neck portion 5b, and a shaft portion 5c. The head portion 5a is provided at the tip of the mandrel 5, and has a larger outer diameter than the shaft portion 5c. The neck portion 5b is provided between the shaft portion 5c and the head portion 5a on the base end side of the head portion 5a, and has a smaller outer diameter than the shaft portion 5c. The shaft portion 5c is a shaft having a constant outer diameter and protrudes from the sleeve 51. The head portion 5a of the mandrel 5 bites into the inner surface of the sleeve 51 to be caught on the inner surface of the sleeve 51.

The flange 52 is a part of the sealing member 50 extending from the sleeve 51 along the outer surface of the lid in the outer diameter direction. In this embodiment, the flange 52 extends in the outer diameter direction from the open end of the sleeve 51 and faces the outer surface 14a of the lid 14 in a state where the resin washer 60 is sandwiched therebetween. A protrusion 52x protruding toward the outer surface 14a of the lid 14 is provided at the radial intermediate portion of the flange 52. The protrusion 52x is an annular protrusion continuous in the peripheral direction of the flange 52. The protrusion 52x bites into the resin washer 60 sandwiched between the flange 52 and the outer surface 14a of the lid 14. Further, the outer peripheral edge of the flange 52 is provided with a wall portion 53 extending along the outer peripheral edge of the resin washer 60 toward the outer surface 14a of the lid 14 and restricting the outer edge of the resin washer 60.

In this embodiment, the sealing member 50 is made of, for example, aluminum or an aluminum alloy. The mandrel 5 is made of, for example, steel (SUS). Although one aspect of the sealing member 50 is shown here, the sealing member 50 is only required to have a structure that ensures airtightness. Among the rivets called blind rivets, various forms in which airtightness is ensured can be adopted.

Resin Washer 60

The resin washer 60 is, for example, a flat annular resin washer through which the sleeve 51 of the sealing member 50 is inserted. The resin washer 60 is attached around the liquid injection port 15. The sleeve 51 of the sealing member 50 is inserted through the resin washer 60. Then, when the mandrel 5 is pulled out from the sealing member 50, a compressed state between the flange 52 of the sealing member 50 and the side surface around the liquid injection port 15 is maintained. As a result, the resin washer 60 ensures the airtightness of the liquid injection port 15. From this point of view, a material having excellent chemical resistance and weather resistance is preferably used as the constituent material of the resin washer 60. For example, a tetrafluoroethylene-perfluoroalkylvinylether copolymer (PFA) is a preferable example. Further, in this embodiment, in addition to PFA, a crystalline resin having heat resistance of 70° C. or higher and electrolytic solution resistance, which is cheaper than PFA, can be used. Examples of such resin materials include polyolefins such as polypropylene (PP) and polyethylene (PE); polyamide (PA); polyphenylene sulfide (PPS); perfluoroethylene propylene copolymer (FEP); and the like.

The procedure for attaching the resin washer 60 and the sealing member 50 to the liquid injection port 15 will be described below. As shown in FIG. 2, first, the resin washer 60 is arranged such that the through-hole of the resin washer 60 overlaps with the liquid injection port 15. Next, the sleeve 51 of the sealing member 50 in which the mandrel 5 is installed in the hollow inner portion is inserted through the through-hole of the resin washer 60 and the liquid injection port 15. At this time, the resin washer 60 is arranged in a space surrounded by a wall surface 51a of the sleeve 51, a lower surface 52a of the flange 52, an inner surface 53a of the wall portion 53, and a bottom surface 16a of the step 16.

Next, while pressing the flange 52 toward the outer surface 14a of the lid 14, the shaft portion 5c of the mandrel 5 is pulled (in the direction of arrow P in FIG. 2). At this time, the head portion 5a is thick and moves while caught on the inner surface of the sleeve 51. At this time, the sleeve 51 of the sealing member 50 is enlarged in diameter to form a diameter-enlarged part 51x inside the lid 14 such that the tip of the sleeve 51 is crimped to an inner surface 14b of the lid 14 (refer to FIG. 3). When the shaft portion 5c is further pulled, the mandrel 5 is broken at the neck portion 5b. Therefore, the shaft portion 5c is pulled out. Although not shown in FIG. 3, the head portion 5a of the mandrel 5 remains in the hollow inner portion of the sealing member 50 after being attached. At this time, the resin washer 60 is compressed while sandwiched between the flange 52 and the outer surface 14a of the lid 14. In this embodiment, the protrusion 52x provided on the flange 52 bites into the resin washer 60, and thus a stronger compressive force is applied to the part. In this manner, the liquid injection port 15 is airtightly sealed with the sealing member 50 and the resin washer 60.

In the secondary battery 100, the lid 14 has the liquid injection port 15, the flat annular resin washer 60 attached to the liquid injection port 15, and the sealing member 50. In other words, the liquid injection port 15 is sealed with the resin washer 60 and the sealing member 50. The sealing member 50 has the sleeve 51 inserted into the liquid injection port 15, and the flange 52 extending from the sleeve 51 along the outer surface 14a of the lid 14 in the outer diameter direction. Further, the resin washer 60 is installed in the liquid injection port 15 and is sandwiched between the flange 52 and the outer surface 14a of the lid 14. By arranging the resin washer 60 between the flange 52 and the outer surface 14a of the lid 14, the resin washer 60 is compressed between the flange 52 and the outer surface 14a, and the airtightness of the liquid injection port 15 can be ensured. The protrusion 52x protruding toward the outer surface 14a of the lid 14 is provided at the radial intermediate portion of the flange 52. When the resin washer 60 is compressed between the flange 52 and the outer surface 14a, the protrusion 52x bites into the resin washer 60, locally imparting a larger compressive force to the resin washer 60, and the airtightness of the liquid injection port 15 can be ensured. On the other hand, the compressive force applied to the, resin washer 60 by the flange 52 escapes in the outer diameter direction of the resin washer 60, the resin washer 60 spreads in the same direction, and the airtightness of the liquid injection port 15 may decrease. However, in the secondary battery 100, the sealing member 50 is provided with a restricting portion (wall portion 53) that restricts the outer edge of the resin washer 60. With the restricting portion, in the resin washer 60, it is possible to suppress the spread of the resin washer in the outer diameter direction, and suppress a decrease in airtightness of the liquid injection port 15.

As described above, the sealing member 50 has a wall portion 53 extending toward the outer surface 14a of the lid 14 along the outer peripheral edge of the resin washer 60. The restricting portion is provided on the inner surface 53a of the wall portion 53. By providing the restricting portion on the inner surface 53a of the wall portion 53 provided on the sealing member 50, the spread of the outer edge of the resin washer 60 in the outer diameter direction can be suppressed. By using the sealing member 50, the decrease in airtightness of the liquid injection port 15 can be suppressed.

The embodiment of the technology disclosed here has been described above. The above-described first embodiment shows an example of a secondary battery to which the technology disclosed here is applied, and is not intended to limit the technology disclosed here. For example, in the first embodiment, the outer surface 14a of the lid 14 is formed with the recessed step 16 around the liquid injection port 15, but it may not always be necessary to form the step 16. Further, other embodiments of the technology disclosed herein will be described below. In the following description, except for the points particularly mentioned, a configuration substantially equivalent to that of the secondary battery 100 according to the first embodiment can be adopted.

Second Embodiment

Figure 4:
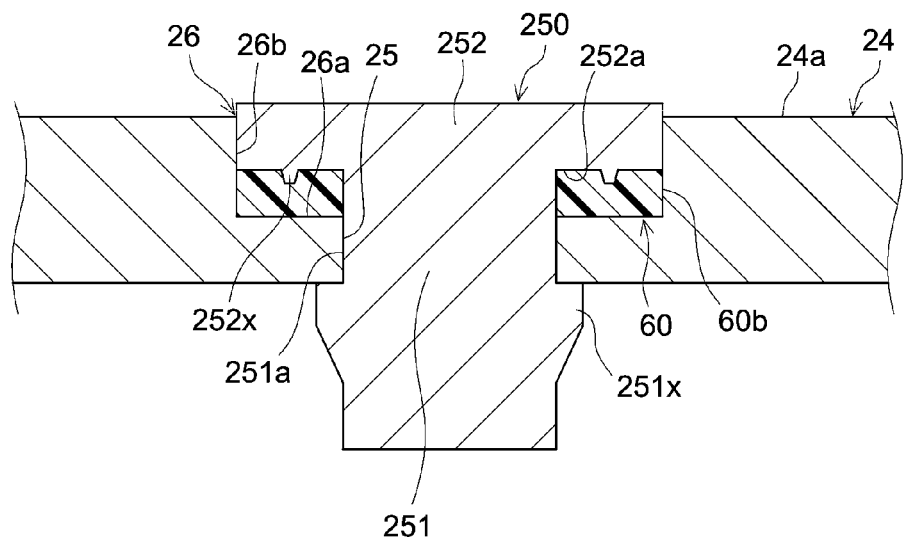
FIG. 4 is a partial cross-sectional view showing a state where a liquid injection port 25 is sealed with a sealing member 250.

In the first embodiment, the sealing member 50 is provided with a restricting portion. However, the present disclosure is not limited thereto. FIG. 4 is a partial cross-sectional view showing a state where a liquid injection port 25 is sealed with a sealing member 250. FIG. 4 shows a state where the liquid injection port 25 is sealed after the sealing member 250 is deformed. The secondary battery according to the second embodiment has a lid 24 and the sealing member 250 instead of the lid 14 and the sealing member 50 of the secondary battery 100. As shown in FIG. 4, the resin washer 60 is attached and then the sealing member 250 is attached to the liquid injection port 25.

In this embodiment, a step 26 recessed from an outer surface 24a around the liquid injection port 25 is provided on the outer surface 24a of the lid 24. As shown in FIG. 4, the recessed step 26 is formed around the liquid injection port 25 according to the region where the sealing member 250 is attached. In this embodiment, when the sealing member 250 and the resin washer 60 are attached around the liquid injection port 25, an outer edge (for example, reference numeral 60b in FIG. 4) of the resin washer 60 is configured to follow the inner wall surface 26b of the recessed step 26.

The sealing member 250 has a sleeve 251 and a flange 252, as shown in FIG. 4. In this embodiment, the sealing member 250 is the same as the sealing member 50 of the first embodiment except that the wall portion is not provided. Therefore, here, the description overlapping with that of the sealing member 50 and the description of the procedure of deforming the sealing member 250 to seal the liquid injection port 25 will be omitted. In FIG. 4, reference numeral 251x indicates a diameter-enlarged part, and reference numeral 252x indicates a protrusion.

In this embodiment, regarding the resin washer 60, the resin washer 60 is arranged in a space surrounded by a wall surface 251a of the sleeve 251, a lower surface 252a of the flange 252, the inner wall surface 26b of the recessed step 26, and a bottom surface 26a.

As described above, in this embodiment, the recessed step 26 around the liquid injection port 25 is provided on the outer surface 24a of the lid 24. The inner wall surface 26b of the step 26 is provided with a restricting portion that restricts the outer edge of the resin washer 60. In this embodiment, when the resin washer 60 is compressed between the flange 252 and the bottom surface 26a of the recessed step 26, even when the compressive three escapes in the outer diameter direction of the resin washer 60, the inner wall surface 26b of the recessed step 26 abuts on the outer edge of the resin washer 60, and the spread of the resin washer 60 in the same direction can be suppressed. Therefore, it is possible to suppress the decrease in airtightness of the liquid injection port 25. Further, in this embodiment, since the inner wall surface 26b of the step 26 is the restricting portion, it is possible to omit providing the restricting portion on the sealing member, and it is possible to improve the productivity of the secondary battery.

Third Embodiment

Figure 5:
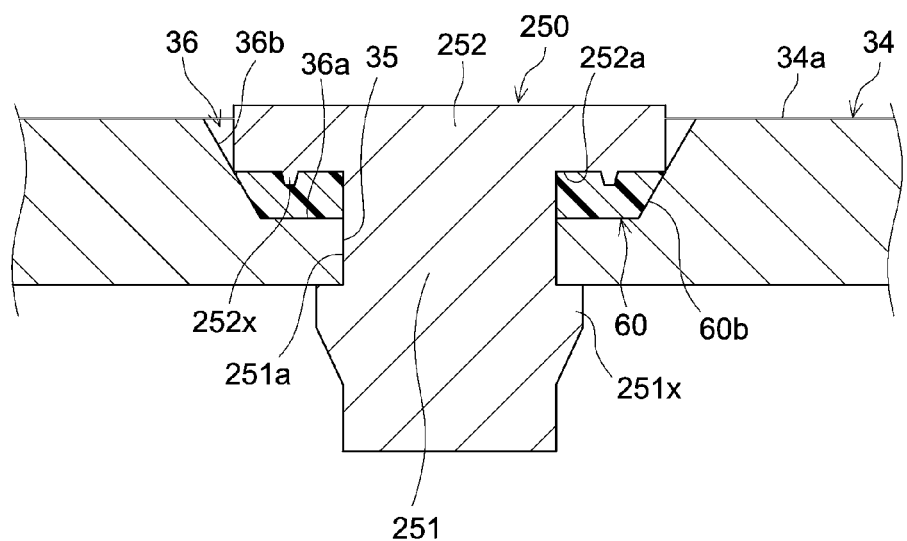
FIG. 5 is a partial cross-sectional view showing a state where a liquid injection port 35 is sealed with the sealing member 250.

FIG. 5 is a partial cross-sectional view showing a state where a liquid injection port 35 is sealed with the sealing member 250. In the third embodiment, the secondary battery has a lid 34 instead of the lid 24 of the second embodiment. As shown in FIG. 5, the resin washer 60 is attached and then the sealing member 250 is attached to the liquid injection port 35. In this embodiment, the recessed step 36 is formed in a slope shape from an outer surface 34a toward a bottom surface 36a. In this embodiment, when the sealing member 250 and the resin washer 60 are attached around the liquid injection port 35, an outer edge (for example, reference numeral 60b in FIG. 5) of the resin washer 60 is configured to follow a slope-shaped inner wall surface 36b of the recessed step 36.

As shown in FIG. 5, the step 36 is formed with a tapered surface that projects toward the inner diameter side of the liquid injection port 35 as the step 36 becomes deeper. The inner diameter (inner diameter of the recess) of the step 36 decreases from the upper end surface (for example, the outer surface 34a of the lid 34) of the step 36 toward the bottom surface 36a. In other words, the restriction of the outer edge of the washer 60 by the restricting portion (in this embodiment, the inner wall surface 36b of the step 36) can be strengthened from the upper end surface of the step 36 toward the bottom surface 36a. Therefore, the effect of suppressing the decrease in airtightness of the liquid injection port 35 can be better realized. At least the part on which the resin washer 60 abuts may be a tapered surface.

OTHER EMBODIMENTS

Further, in the first embodiment, as shown in FIGS. 2 and 3, only the liquid injection port 15 is formed on the bottom surface 16a of the recessed step 16. However, the present disclosure is not limited thereto. A protrusion protruding toward the lower surface 52a of the flange 52 may be formed at the radial intermediate portion of the bottom surface 16a.

Such protrusions are, for example, annular protrusions continuous in the peripheral direction of the bottom surface 16a. By forming such protrusions, the effect of suppressing the decrease in airtightness of the liquid injection port 15 can be better realized.

What is claimed is:

1. A secondary battery comprising:
an electrode body;
a case main body having an opening for accommodating the electrode body; and
a lid attached to the opening of the case main body, wherein
the lid has a liquid injection port, a flat annular resin washer attached to the liquid injection port, and a sealing member,
the sealing member comprises a sleeve inserted into the liquid injection port, and a flange extending from the sleeve along an outer surface of the lid in an outer diameter direction,
the resin washer is installed in the liquid injection port and is sandwiched between the flange and the outer surface of the lid,
a protrusion protruding toward the outer surface of the lid is provided at a radial intermediate portion of the flange,
a restricting portion, which surrounds an outermost peripheral surface of the resin washer and restricts a spread of the resin washer in a radially outward direction from an outer diameter of the resin washer, is provided in the sealing member,
a step recessed around the liquid injection port is provided on the outer surface of the lid,
the flange has a wall portion extending from an outer peripheral edge of the flange toward the outer surface of the lid along the outermost peripheral surface of the resin washer,
the restricting portion is provided on an inner surface of the wall portion, and
the resin washer is arranged in a space surrounded by a wall surface of the sleeve, a lower surface of the flange, the inner surface of the wall portion, and a bottom surface of the step.

2. The secondary battery according to claim 1, wherein the inner surface of the wall portion is abutted against the outermost peripheral surface of the resin washer.

3. The secondary battery according to claim 1, wherein a further protrusion protruding toward the lower surface of the flange is formed at a radial intermediate portion of the bottom surface of the step.

4. The secondary battery according to claim 3, wherein the further protrusion is an annular protrusion continuous in a peripheral direction of the bottom surface.

\* \* \* \* \*